(12) United States Patent
Wu

(10) Patent No.: US 10,018,782 B2
(45) Date of Patent: Jul. 10, 2018

(54) OPTICAL FIBER STRIPPING METHODS AND APPARATUS

(71) Applicant: CORNING OPTICAL COMMUNICATIONS LLC, Hickory, NC (US)

(72) Inventor: Qi Wu, Painted Post, NY (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 15/148,389

(22) Filed: May 6, 2016

(65) Prior Publication Data
US 2016/0349453 A1    Dec. 1, 2016

Related U.S. Application Data

(60) Provisional application No. 62/167,518, filed on May 28, 2015.

(51) Int. Cl.
| B32B 38/10 | (2006.01) |
| G02B 6/245 | (2006.01) |
| B32B 43/00 | (2006.01) |
| B08B 7/00 | (2006.01) |

(52) U.S. Cl.
CPC ............ *G02B 6/245* (2013.01); *B08B 7/0007* (2013.01); *B32B 38/10* (2013.01); *B32B 43/006* (2013.01); *Y10T 156/1153* (2015.01); *Y10T 156/1911* (2015.01)

(58) Field of Classification Search
CPC . B32B 38/10; B32B 43/006; Y10T 156/1153; Y10T 156/1911; B08B 7/0007; G02B 6/245

USPC .......................... 156/708, 711, 752, 757, 923
See application file for complete search history.

(56) References Cited

U.S. PATENT DOCUMENTS

| 2,636,408 A | * | 4/1953 | Mitchell | ............. | H02G 1/1275 |
| | | | | | 156/714 |
| 3,475,592 A | | 10/1969 | Berkl | | |
| 3,881,902 A | | 5/1975 | Deluca | | |

(Continued)

FOREIGN PATENT DOCUMENTS

DE         3224465 A1     1/1984

OTHER PUBLICATIONS

3SAE Technologies, Inc., Burst Technology for High Strength Optical Fiber Stripping, downloaded from internet on Apr. 15, 2016, 3 pages.

(Continued)

*Primary Examiner* — Mark A Osele
*Assistant Examiner* — Nickolas Harm

(57) ABSTRACT

An apparatus for removing at least one coating from a lengthwise section of an optical fiber includes a heater extending at least partially around and at least partially defining an elongate heating region configured for receiving the lengthwise section of the optical fiber. The heater can heat the heating region to a temperature above the thermal decomposition temperature of the at least one coating. A controller automatically deactivates the heater after removal of the at least one coating from the lengthwise section of the optical fiber in the heating region. Thereafter, an air mover can cause ambient air to cool the heater.

17 Claims, 5 Drawing Sheets

(56) References Cited

U.S. PATENT DOCUMENTS

| | | | |
|---|---|---|---|
| 4,055,616 A * | 10/1977 | Keen | H02G 1/1275 |
| | | | 156/714 |
| 4,304,582 A | 12/1981 | Aussenegg et al. | |
| 4,460,820 A | 7/1984 | Matsumoto et al. | |
| 4,992,044 A | 2/1991 | Philipossian | |
| 5,030,810 A | 7/1991 | Haley et al. | |
| 5,070,232 A | 12/1991 | Martin | |
| 5,155,798 A | 10/1992 | Van Denend | |
| 5,181,269 A | 1/1993 | Petisce | |
| 5,378,300 A | 1/1995 | Huvard et al. | |
| 5,750,694 A | 5/1998 | Jones et al. | |
| 5,939,136 A | 8/1999 | Cronk et al. | |
| 5,968,283 A | 10/1999 | Walraven et al. | |
| 6,244,323 B1 | 6/2001 | Miller | |
| 6,402,856 B1 | 6/2002 | Vetrano | |
| 6,436,198 B1 | 8/2002 | Sawin et al. | |
| 6,607,576 B1 | 8/2003 | Sikka et al. | |
| 7,003,985 B2 | 2/2006 | Swain et al. | |
| 7,212,718 B2 | 5/2007 | Sato | |
| 7,378,460 B2 | 5/2008 | Schmidt et al. | |
| 8,030,594 B2 | 10/2011 | Thomas et al. | |
| 8,226,880 B2 | 7/2012 | Pricone | |
| 8,317,972 B2 | 11/2012 | Dunwoody et al. | |
| 8,330,081 B2 | 12/2012 | Dimmick et al. | |
| 8,455,166 B2 | 6/2013 | Op de Beeck et al. | |
| 8,557,052 B2 | 10/2013 | Lambert et al. | |
| 8,866,051 B2 | 10/2014 | Zamzow | |
| 9,167,626 B1 | 10/2015 | Wu | |
| 9,557,477 B2 | 1/2017 | Tachibana et al. | |
| 9,604,261 B2 * | 3/2017 | Wu | B08B 7/0085 |
| 2001/0023598 A1 | 9/2001 | Kohmura et al. | |
| 2002/0008213 A1 | 1/2002 | Kawada et al. | |
| 2002/0100748 A1 | 8/2002 | Andersen | |
| 2003/0062070 A1 * | 4/2003 | Swain | B08B 7/0071 |
| | | | 134/105 |
| 2004/0052487 A1 | 3/2004 | Aloisio et al. | |
| 2004/0231466 A1 | 11/2004 | Oldigs et al. | |
| 2005/0281521 A1 | 12/2005 | Oku et al. | |
| 2006/0289433 A1 | 12/2006 | Timans | |
| 2007/0034057 A1 | 2/2007 | Khoshneviszadeh | |
| 2007/0172191 A1 * | 7/2007 | Song | G02B 6/245 |
| | | | 385/134 |
| 2007/0187035 A1 | 8/2007 | To et al. | |
| 2008/0128084 A1 * | 6/2008 | Dunwoody | G02B 6/245 |
| | | | 156/714 |
| 2009/0053772 A1 | 2/2009 | Belgrader | |
| 2009/0199597 A1 | 8/2009 | Danley et al. | |
| 2011/0047669 A1 | 3/2011 | Carr | |
| 2011/0308259 A1 | 12/2011 | Wray et al. | |
| 2012/0128303 A1 * | 5/2012 | Koyama | G02B 6/3846 |
| | | | 385/60 |
| 2012/0219258 A1 | 8/2012 | Grandidge et al. | |
| 2013/0306620 A1 | 11/2013 | Halloran et al. | |
| 2013/0319052 A1 | 12/2013 | Dansal et al. | |
| 2014/0193119 A1 | 7/2014 | Isenhour et al. | |

OTHER PUBLICATIONS

Hyunsoo Park, et al., Noncontact Optical Fiber Coating Removal Technique with Hot Air Stream, Journal of Lightwave Technology, vol. 23, No. 2, Feb. 2005, 7 pages.

International Search Report and Written Opinion PCT/US2016/030936 dated Aug. 5, 2016.

* cited by examiner

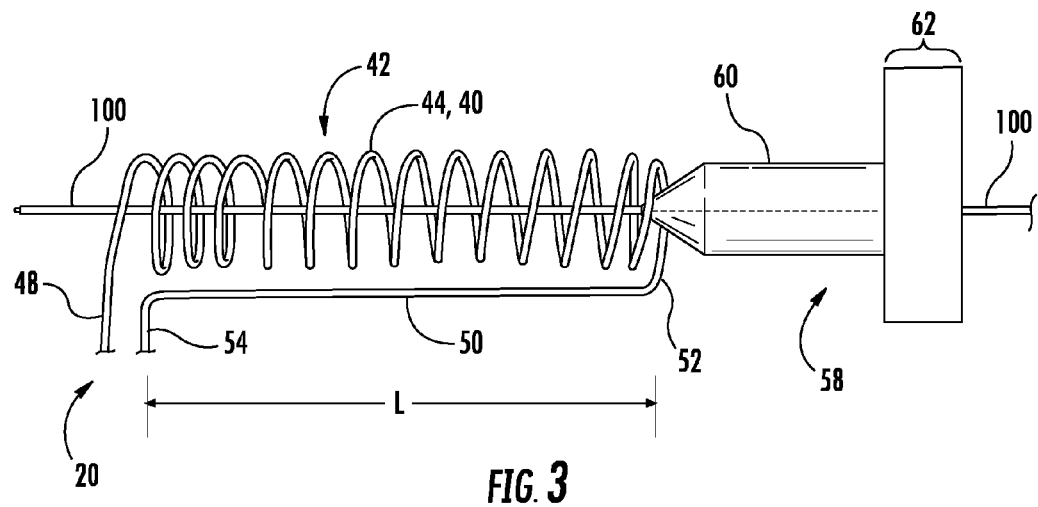
FIG. 3
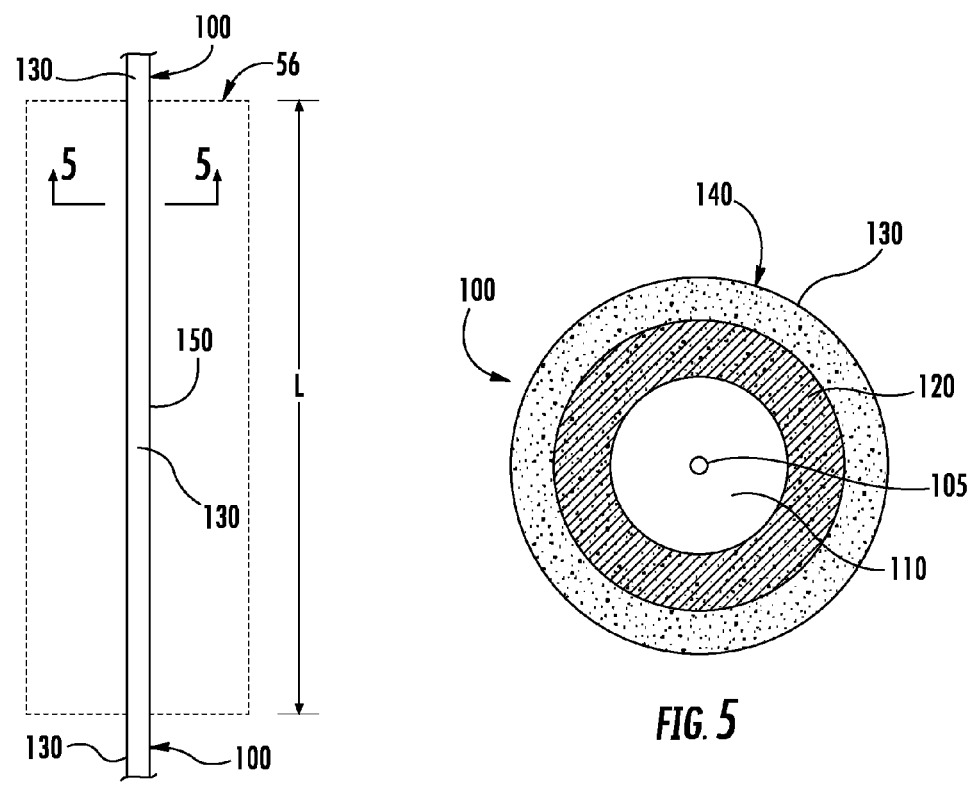
FIG. 4
FIG. 5

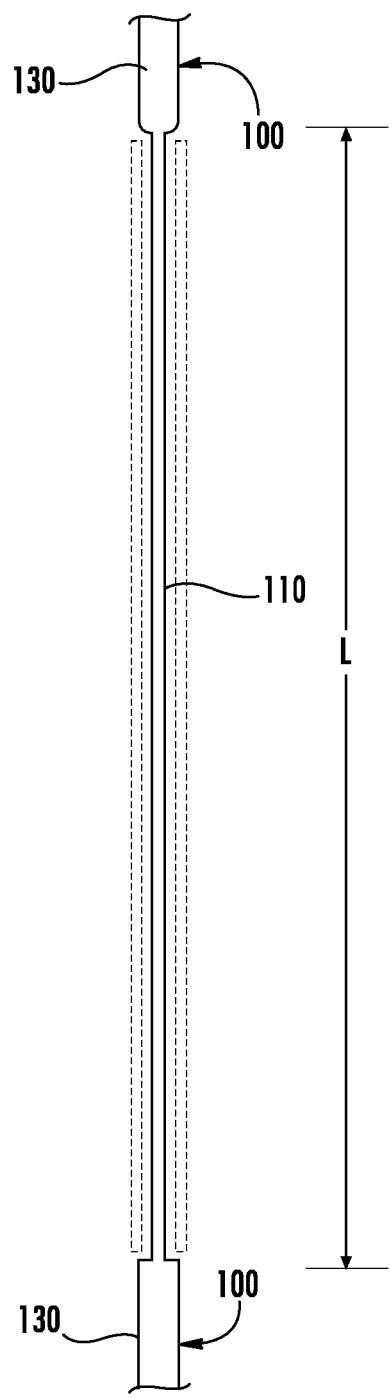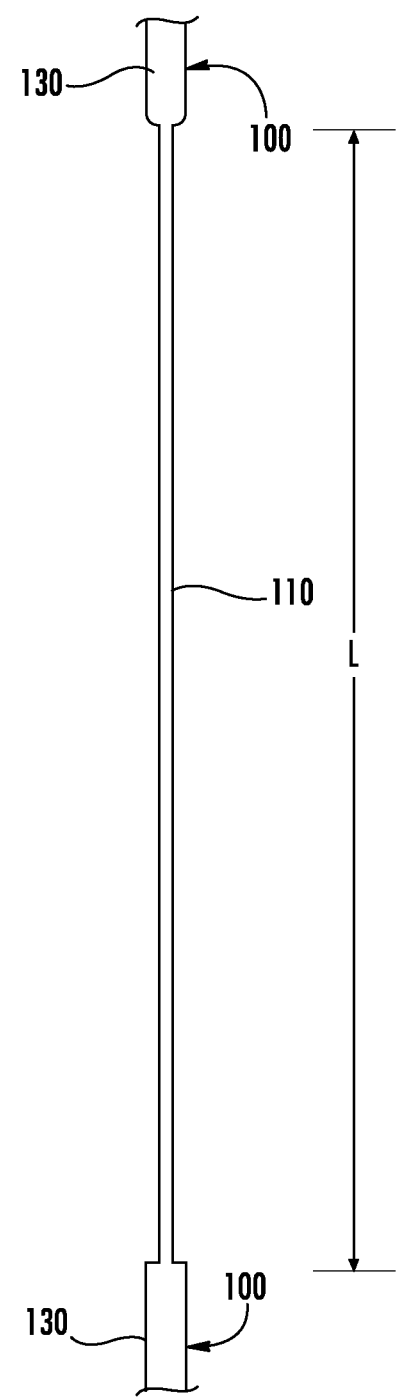
FIG. 6
FIG. 7

OPTICAL FIBER STRIPPING METHODS AND APPARATUS

PRIORITY APPLICATION

This application claims the benefit of priority under 35 U.S.C. § 119 of U.S. Provisional Application Ser. No. 62/167,518, filed on May 28, 2015, the content of which is relied upon and incorporated herein by reference in its entirety.

BACKGROUND

This disclosure generally relates to stripping optical fiber coatings and, more particularly, to methods and apparatus for non-contact stripping of optical fiber coatings.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or in the field (e.g., using a "field-installable" fiber optic connector).

Regardless of where installation occurs and the type of connector used, stripping of optical fiber coatings is typically an important step in terminating optical fibers in preparation for installing connectors. For field installations, an inherently accurate and robust coating stripping tool can be of particular importance because the technicians or operators making the installations may have varying amounts of relevant training or experience.

A bare glass fiber and a 250 um coated optical fiber may appear indistinguishable to untrained eyes. Therefore, mechanical stripping can be challenging due to visibility issues. In addition, mechanical stripping may cause direct contact between tool blades and bare glass, which can cause flaws in the optical fibers and reduce their tensile strengths. Such flaws and reductions in tensile strength may be restricted through the use of non-contact stripping methods and apparatus. However, at least some of the non-contact stripping methods and apparatus are better suited for manufacturing settings rather than field settings.

There is a desire for fiber stripping methods and apparatus that provide a new balance of properties.

SUMMARY

An aspect of this disclosure is the provision of methods and apparatus for use in non-contact stripping of an optical fiber. As used herein, "an optical fiber" refers to one or more optical fibers such that the methods and apparatuses disclosed may be used to simultaneously and/or successively strip a plurality of optical fibers in a non-contact manner.

In accordance with an embodiment of this disclosure, an apparatus for removing at least one coating from a lengthwise section of an optical fiber comprises a heater extending at least partially around and at least partially defining an elongate heating region configured for receiving the lengthwise section of the optical fiber, wherein the heater is configured for heating the heating region to a temperature above the thermal decomposition temperature of the at least one coating; and a controller is operatively associated with the heater for automatically deactivating the heater. The controller may be configured for automatically deactivating the heater by not later than immediately after removal (e.g., explosive removal) of the at least one coating from the lengthwise section of the optical fiber in the heating region. For example, the controller may be configured for deactivating the heater at a predetermined time after the controller activates the heater.

As one example, the heater may be a resistive heater having an electrically conductive coil extending around the heating region. The heating region may be configured for receiving the lengthwise section of the optical fiber through an end of the coil.

The apparatus may further include an air mover configured for being operated to cause ambient air to cool the heater. The air mover may be configured for causing the ambient air to flow along a flowpath in which the heater is positioned, and the apparatus may be configured so that the flowpath extends crosswise to a lengthwise axis of the heating region. The controller may be operatively associated with the air mover for: restricting operation of the air mover while the heater is on, causing the air mover to operate while the heater off, and/or activating the air mover after the heater has been deactivated.

The apparatus may further include at least one sidewall or other suitable structure(s) configured to at least partially enclose the heater. The at least one sidewall and/or other suitable structure(s) may at least partially form a housing defining an interior chamber and an opening configured for providing access to the interior chamber from outside of the housing. The heating region may be positioned in the interior chamber. The heater may be positioned proximate the opening to the interior chamber. The heating region may be configured for receiving the lengthwise section of the optical fiber by way of the opening to the interior chamber. The housing may be configured so that the heating region is open to the ambient environment during operation of the heater.

The apparatus may further include a support apparatus configured to hold the optical fiber so that the optical fiber extends away from the support apparatus and into the heating region in a cantilevered manner.

In accordance with an embodiment of this disclosure, a method for removing at least one coating from a lengthwise section of an optical fiber may include positioning the lengthwise section of the optical fiber in an elongate heating region, wherein a heater extends at least partially around and defines the heating region; causing the at least one coating of the lengthwise section to explode, comprising operating the heater so that the at least one coating of the lengthwise section of the optical fiber is heated to a temperature above the thermal decomposition temperature of the at least one coating while the lengthwise section of the optical fiber is in the heating region; and automatically deactivating the heater.

The deactivating of the heater may be comprised of deactivating the heater at a predetermined time after activation of the heater. The optical fiber may be supported in a cantilevered manner during the heating. The heater may comprise an electrically conductive coil, and an end of the optical fiber may be inserted through an end of the electrically conductive coil. An air mover may be operated to cool the heater with ambient air while the heater is off.

Additional features and advantages will be set forth in the detailed description which follows, and in part will be readily apparent to those skilled in the technical field of optical communications. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiments, and together with the description serve to explain principles and operation of the various embodiments. Features and attributes associated with any of the embodiments shown or described may be applied to other embodiments shown, described, or appreciated based on this disclosure.

FIG. 3 is a side view of an optical fiber being held at one end and extending through the heater of the stripping apparatus, wherein the optical fiber is in a ready-to-be-stripped state, in accordance with a version of the first embodiment.

FIG. 4 is representative of schematic plan and side elevation views showing a portion of the optical fiber positioned in a central heating region of the stripping apparatus, wherein the optical fiber is in a ready-to-be-stripped state.

FIG. 5 is an isolated cross-sectional view of an example of an unstripped optical fiber, wherein the cross-section is taken along line 5-5 of FIG. 4.

FIG. 6 is similar to FIG. 4, except for being schematically illustrative of a state in which a length of at least one coating of the optical fiber is stripping or separating (e.g., exploding away) from the cladding of the optical fiber.

FIG. 7 is similar to FIG. 4, except for being illustrative of a state in which a mid span of the optical fiber has been stripped.

DETAILED DESCRIPTION

Various embodiments will be further clarified by examples in the description below. In general, this description relates to an optical fiber stripping apparatuses and methods of stripping optical fibers, wherein the stripping may comprise a heat-induced burst or explosion.

Figure 1:
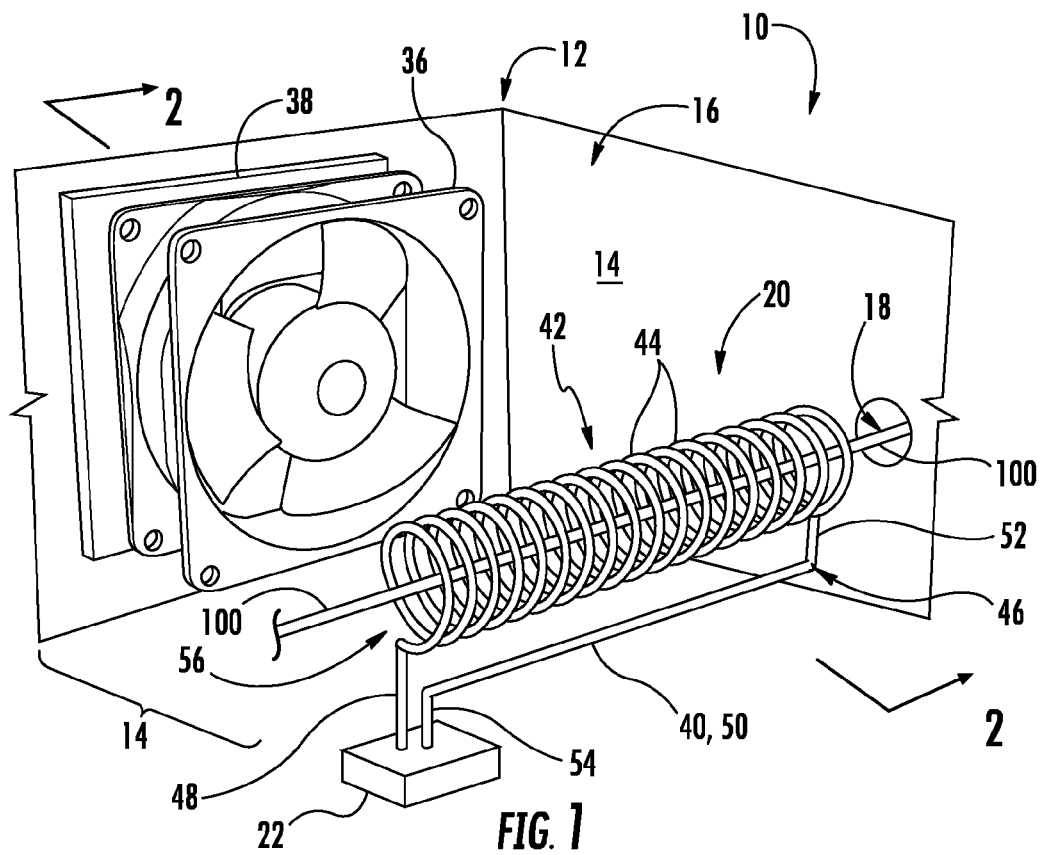
FIG. 1 is schematic perspective view of selected internal features of an optical fiber stripping apparatus, in accordance with a first embodiment of this disclosure.
Figure 2:
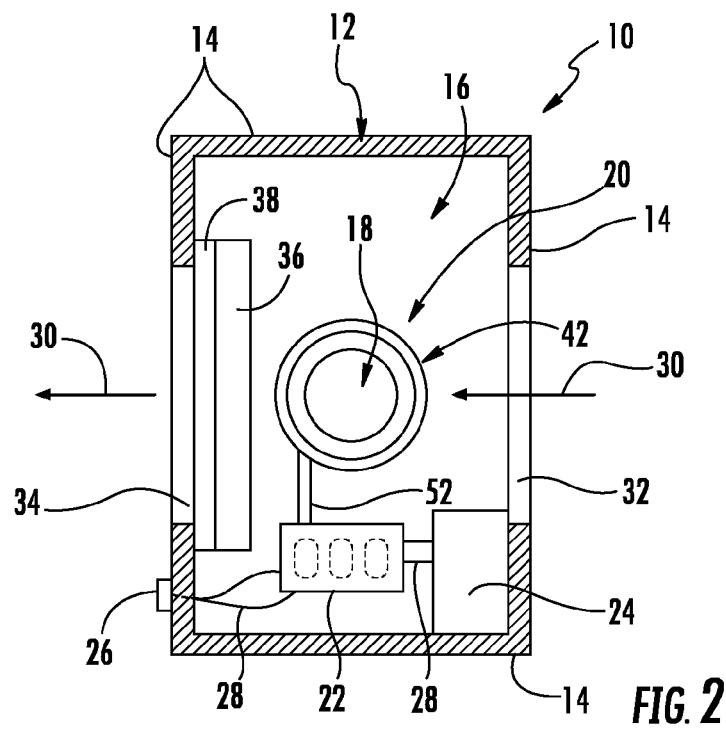
FIG. 2 is a schematic, partially cross-sectional view of the stripping apparatus, wherein the cross section is taken substantially along line 2-2 of FIG. 1.

FIG. 1 illustrates some of the internal features of a stripping apparatus 10 configured so that it can be used for stripping away a length of at least one coating of an optical fiber 100, in accordance with a first embodiment of this disclosure. The stripping apparatus 10 may be described as a non-contact and non-air-stream thermal stripping system with a wide tolerance for the position of the optical fiber 100 therein. FIG. 2 is a cross-sectional view taken substantially long line 2-2 of FIG. 1, wherein only an enclosure or housing 12 of the stripping apparatus 10 is cross sectioned, and examples of internal features that are not included in FIG. 1 are schematically shown in FIG. 2. In the first embodiment, the housing 12 is configured for being handheld, so that the stripping apparatus 10 may be a portable handheld device that may be conveniently carried into and used in the field. Alternatively or in addition, the stripping apparatus 10 may also be configured for use in manufacturing settings. In accordance with at least some embodiments of this disclosure, the stripping apparatus 10 is not limited to any particular type of housing, enclosure, partial enclosure, or the like, and in some embodiments the housing may be in the form of an open frame and/or be omitted.

The housing 12 includes one or more sidewalls 14 extending around an interior chamber 16 of the housing. In the first embodiment, a hole that extends through at least one sidewall 14 may be referred to as a main opening 18 to the interior chamber 16. The main opening 18 is configured for allowing a user of the stripping apparatus 10 to insert an end of an optical fiber 100 therethrough and into the chamber 16, as will be discussed in greater detail below.

In the embodiment shown in the drawings, the housing 12 carries and at least partially contains, or more specifically the interior chamber 16 of the housing fully contains, at least one of each of a heater 20, controller 22 and battery 24. More generally, the at least one sidewall 14 at least partially encloses the heater 20, controller 22 and/or battery 24.

The controller 22 is configured for at least partially controlling operation of the heater 20. The battery 24 is for providing electrical power to at least the controller 22 and heater 20. The controller 22 may be responsive to a user manually operating an activating feature such as a switch, wherein the switch may be in the form of an external push-button switch 26 (FIG. 2) mounted to a sidewall 14 and accessible at the exterior of the housing 12. The heater 20, controller 22, battery 24 and switch 26 can be respectively electrically connected to one another in any suitable manner, such as through electrical wiring 28. The battery 24 may be a rechargeable, 6 volt, direct-current battery, although other suitable batteries may be used. Alternatively, one or more of the features of the stripping apparatus 10 may be positioned outside of the housing 12. For example, the source of the electrical power may be an external power source rather than, or in addition to, the internal power source or battery 24.

Optionally, the stripping apparatus 10 can provide a flowpath that is schematically represented by arrows 30 in FIG. 2. As shown in FIG. 2, the flowpath 30 may extend crosswise to, or more specifically substantially perpendicular to, the central lengthwise axis of a coil heating element 42 of the heater 20. The flowpath 30 can be defined by upstream and downstream openings 32, 34 to the interior chamber 16 that are respectively defined by opposite or other suitably positioned sidewalls 14. Each of the openings 32, 34 may comprise one or more openings that may be partially obstructed by louvers, screens, gratings, or other suitable features. In the first embodiment, the openings 32, 34 remain open during operation of the heater 20 so that the heater is open to (e.g., in fluid communication with) the ambient environment during operation of the heater. At least one air mover, such as a rotary fan 36, may be positioned in the flowpath 30 within the interior chamber 16 for forcing air to flow along the flowpath. One or more air filters 38 may be positioned in the flowpath 30. The openings 32, 34, fan 36 and/or air filter 38 may be omitted.

The heater 20 may comprise at least one resistive heating element that may be in the form of a high-resistance electrical wire 40 that becomes very hot in response to the flow of electrical current therethrough. The heater 20 can consist of, or consist essentially of, a resistance heating element formed from the metal wire 40. In the first embodiment, a majority of the wire 40 forms the heating coil 42, which may be in the form of, or substantially in the form of, a helix. The wire 40 is in a bent configuration so that the coil 42 includes multiple loops 44 that are arranged in a series that extends between opposite ends of the coil. For example, the coil 42 may comprise from about 10 to about 20 loops 44, from about 12 to about 18 loops, or any other subranges therebetween. The coil 42 of the heater 20 is shaped so as to extend at least partially around (e.g., completely around) and concentrically along a central heating region 56, through which the optical fiber 100 coaxially extends in FIGS. 1 and 3. In the first embodiment, the central lengthwise axes of the coil 42 and heating region 56, and the axis of the main opening 18, are coaxial or substantially coaxial with one another.

The wire 40 may be formed of a metal alloy such as, but not limited to, nichrome or an iron-chromium-aluminum alloy that may be available under the brand name Kanthal. As one example, the wire 40 may be a 0.2 mm diameter nichrome wire of the type used in electrically heated cigarette lighters. As a more specific example, the wire may be a 30 AWG nichrome 80 wire, the outer diameter of the coil may be about 3.1 mm, the average spacing between the loops 44 may be about 1.1 mm, and the electrical resistance of the heater 20 may be about 4.4 ohms (Ω).

Referring to FIG. 1, the opposite ends of the coil 42 can be respectively connected to the controller 22 or other suitable feature(s) by way of front and rear leads, support sections or base sections 46, 48 of the wire 40, wherein each of the leads or base sections can terminate proximate the same end of the coil 42. The front and rear base sections 46, 48 are respectively connected to and support the opposite front and rear ends of the coil 42. The front base section 46 of the wire 40 may include an elongate linear section 50 positioned between upright sections 52, 54. The linear section 50 extends along, and may be parallel or substantially parallel to, the central lengthwise axis of the coil 42, wherein the optical fiber 100 is coaxial with the lengthwise axis of the coil in FIG. 1. The rear base section 48 may be in the form of an upright section of the wire 40. The base sections 46, 48 may be more generally referred to as support sections, wherein the support sections may support the coil 42 from above, so that it is suspended, or the coil 42 may be supported in any other suitable manner.

As shown in FIG. 3, when the stripping apparatus 10 is being used, the optical fiber 100 may be supported at only one end by a support apparatus 58, so that the optical fiber extends away from the support apparatus in a cantilevered manner. The support apparatus 58 may include a ceramic ferrule 60 having a central bore through which a portion of the optical fiber 100 extends, as schematically illustrated by dashed lines in FIG. 3. The central bore of the ferrule 60 may have diameter of 260 μm. The ferrule 60 may be held or supported in any suitable manner, such as manually by way of a holding tool 62 that may be in the form of a pliers or any other suitable tool.

While the optical fiber 100 extends through the central heating region 56 as shown in FIGS. 3 and 4, the heater 20 can be operated to heat the central heating region 56 in a manner that will strip the optical fiber. Advantageously in accordance with the first embodiment, the optical fiber 100 is not required to coaxially extend in the central heating region 56 (i.e., not required to be coaxial with the central lengthwise axis of the coil 42) during stripping, and the optical fiber may be held at only one end.

Referring to FIG. 5, the optical fiber 100 can include a substantially cylindrical multi-layer coating 140 comprising substantially cylindrical polymer coatings 120, 130. The multi-layer coating 140 can comprise a dual-layer polymer coating 120, 130 that extends around a glass cladding 110 and glass core 105. The inner primary coating 120 may be configured to act as a shock absorber to minimize attenuation caused by any micro-bending of the fiber 100. The outer secondary coating 130 may be configured to protect the primary coating 120 against mechanical damage, and to act as a barrier to lateral forces. For example, the secondary coating 130 may have a diameter of about 200 um. The multi-layer coating 140 can further include a colored, thin ink layer for identification, and this additional layer may be coated onto the outer surface of the secondary coating 130. The outer diameter of the coated optical fiber 100 may be about 250 um. More specifically, the optical fiber 100 may include with an acrylate coating 140 having an outer diameter of 250 μm, and optionally the optical fiber may further include an additional colored ink layer. The ink layer may be about 5 μm thick.

In accordance with an embodiment of this disclosure, the cladding 110 and core 105 have a higher thermal decomposition temperature than the coatings 120, 130, and the primary coating 120 is softer than and has a lower thermal decomposition temperature than the secondary coating 130. A variety of polymeric materials are suitable for use as the primary and secondary coatings 120, 130. For example, the primary coating 120 may be soft UV-cured polymers, and the secondary coating 130 may be highly cross-linked UV-cured polymers. In one example, the primary coating 120 can have a thermal decomposition temperature of about 279° C., and the secondary coating 130 can have a thermal decomposition temperature of about 384° C., so that the difference in their thermal decomposition temperatures is about 100° C.

Referring to FIGS. 4 and 5, the heater 20 (FIGS. 1-3), central heating region 56, and optical fiber 100 may be cooperatively configured for facilitating substantially uniform heating over or along a lengthwise section ("fiber section") 150 of the optical fiber 100, for stripping the coatings 120, 130 from the fiber section 150, as discussed in greater detail below. The outer periphery of the central heating region 56 is schematically represented by dashed lines in FIGS. 3 and 8-10.

As best understood with references to FIGS. 3 and 5-7, the coil 42 can be configured to have a length L and so that the central heating region 56 is about the same length L, so that the fiber section 150 that is stripped by the stripping apparatus 10 is about the same length L. The length L can be sufficient for many connector applications. For example, the length L can be about 12 mm. In addition, these lengths L can be longer or shorter than about 12 mm. For example, the length L may be at least about 8 mm, at least about 10 mm, at least about 12 mm, or about 15 mm or longer. For example, the length L may be within a range of from about 8 mm or about 10 mm to about 24 mm, from about 12 mm to about 24 mm, from about 12 mm to about 20 mm, or any other subranges therebetween.

With the coatings 120, 130 having different vaporization or thermal decomposition temperatures and the fiber section 150 positioned in the central heating region 56 as discussed above, the heater 20 can be operated to rapidly heat the coatings 120, 130 of the fiber section 150 to a temperature that is above the thermal decomposition temperature of the primary coating 120 but below the thermal decomposition temperature of the secondary coating 130. As a result, the primary coating 120 of the fiber section 150 can decompose into gas and cause sufficient pressure to build up inside the secondary coating 130 of the fiber section 150 for causing an explosive rupture of the region encircled by the secondary coating 130 of the fiber section 150, without substantially damaging the cladding 110 or core 105 of the fiber 100.

An example of a method for stripping the coatings 120, 130 from the fiber section 150 is described in the following, in accordance with the first embodiment. Initially, the optical fiber 100 is placed through the bore of the ferrule 60, wherein the bore may have a diameter of 260 μm. While the free end of the optical fiber 100 extends outwardly from the ferrule 60 in a cantilevered manner, the free end of the optical fiber may be inserted through the main opening 18 and then inserted through the end of the coil 42 into the central heating region 56 by way of manually facilitated relative movement between the stripping apparatus 10 and the ferrule. In one example, the stripping apparatus 10 and the ferrule 60 may be held so that the fiber section 150 extends substantially coaxially through the central heating region 56.

Then, the stripping apparatus 10 can be operated, such as under the control of the controller 22, in response to a user pressing the external button-like switch 26, or the like, while the fiber section 150 extends substantially coaxially, or in any other suitable arrangement, through the central heating region 56. As a result, the coatings 120, 130 of the fiber section 150 are rapidly heated to the temperature at which the secondary coating 130 bursts (e.g., in response to the vaporization of the primary coating 120). This heating can comprise quickly heating the coil 42 while the optical fiber 100 is in the central heating region 56 to create a temperature field over the fiber section 150 that is substantially uniform. For example, the heater 20 may have a thermal mass that allows the coil 42 to be rapidly heated to above 500° C., so that the coatings 120, 130 are heated to a temperature beyond the burst temperature, causing the vaporization of the primary coating 120 and bursting away of the secondary coating 130. An advantage of the heater 20 including the coil 42 is that when both ends of the heater are in fixed positions, the coil can absorb the thermal expansion of the heater in a manner that seeks to minimize any reconfiguring of the central heating region 56.

The coil 42 can be configured and the heater 20 can be operated, such as under the control of the controller 22, so that the explosion (e.g., stripping) of the coatings 120, 130 occurs substantially simultaneously along the entire length L of the fiber section 150, and so that the temperature field throughout the central heating region 56 may be substantially uniform, which can have the effect of maintaining the integrity of the secondary coating 130 until the burst temperature is reached. In contrast, an ununiform temperature field can lead to decomposition of the secondary coating 130, rendering it unable to contain sufficient vapor pressure for the desired explosion or bursting. Without the explosion process, slow decomposition and oxidation of the coating 130 may generate harmful gas.

As shown in FIG. 4, the fiber section 150 can be a mid span of the optical fiber 100. When the fiber section 150 is a mid span of the fiber 100, the lengthwise sections of the fiber 100 immediately adjacent to the mid span fiber section 150 can function as boundary structures that at least partially contain the pressure generated by the decomposing primary coating 120 of the fiber section 150, so that any leakage of the pressure from the fiber section 150 is restricted from escaping out of ends of the fiber section 150, so that the pressure is contained in a restricted area in a manner that seeks to provide the desired, controlled exploding and stripping of the coatings 120, 130 of the fiber section 150. As a contrasting example, when the fiber section 150 is an end section of the fiber 100, it may be the case that the pressure generated by the vaporizing primary coating 120 of the fiber section 150 escapes out the end of the fiber section 150 such that the explosion may not occur. Instead, the coatings 120, 130 of the fiber section 150 may decompose or burn.

In one embodiment, the stripping apparatus 10 is automatically operative, such as under the automatic control of the controller 22, so that the heater 20 is automatically deactivated or turned off shortly before, or not later than immediately after, the explosion that "strips" the coatings 120, 130 away from the fiber section 150. Quickly turning off the heater 20 in this manner seeks, for example, to avoid or at least minimize any oxidation and burning of the unstripped sections of the coatings 120, 130.

More specifically, the controller 22 and associated features can be configured for automatically controlling the flow of electrical current through the wire 40, for controlling the heat generated by the wire 40. For example, the electrical current supplied to the wire 40 may be automatically controlled by the controller 22 according to a predetermined electrical current profile. As a more specific example, the electrical current can be supplied to the wire 40 for a period of time in response to the stripping process being initiated, such as by a user operating a feature, such as an icon, key, push-button switch 26, or the like. For example, the controller 22 may be configured so that the heater 20 is automatically turned off or deactivated at a predetermined time, wherein the predetermined time may be a time within a range of from about 1 second to about 3 seconds after the heater is turned on or activated, or a range of from about 1.7 seconds to about 2.1 seconds after the heater is turned on or activated, and as a more specific example the predetermined time may be about 1.9 seconds. The selection of the predetermined time at which the controller 22 automatically turns off the heater 20 may depend upon factors associated with the configuration of the multi-layer coating 140 and/or the configuration of the stripping apparatus 10; therefore, the predetermined time may vary, and it may be determined based upon empirical evidence.

In one example, while the fiber section 150 is positioned in the central heating region 56, the fiber coatings 120, 130 of the fiber section 150 may remain intact for about 2.0 seconds after the heater 20 is activated by the controller 22, and the fiber coatings 120, 130 of the fiber section 150 may explode at about 2.5 seconds after the heater is activated by the controller. In FIG. 6, substantially the entirety of the coatings 120, 130 of the fiber section 150 are shown being exploded away from the cladding 110 of the fiber section 150, wherein the explosion is schematically represented by stippling. As shown in FIG. 7, the length L of the portion of the cladding 110 from which the coatings 120, 130 have been stripped can substantially match both the length of the central heating region 56 and the length of the coil 42. The majority of the sections of the coatings 120, 130 that are stripped may bursts away from the cladding 110 substantially without generating smoke, and substantially without leaving carbon residue on the glass cladding 110.

The tip of the ferrule 60, which may be ground to a cone shape or other suitable shape, may function as a thermal shield that protects the fiber coatings 120, 130 within the bore of the ferrule. After the optical fiber 100 is stripped, the optical fiber may be removed from both the stripping apparatus 10 and the ferrule 60, by way of relative movement therebetween. For example, the optical fiber 100 may be pulled out of the stripping apparatus through the main opening 18. Then, the optical fiber 100 may be installed to a fiber optic connector. A respective portion of the stripped optical fiber 100 will typically be cleaved or cut off. The stripper apparatus 10 can be periodically cleaned by running the heater 20 without an optical fiber 100 in the stripping apparatus, so that residual coatings may be at least partially removed from the heater and the ferrule 60.

Figure 8:
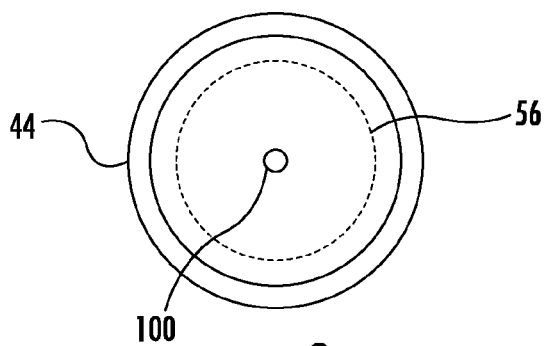
FIG. 8 is a schematic, isolated end elevation view of an optical fiber extending coaxially through a representative loop of a coil of the heating apparatus, in accordance with an example of the first embodiment.

As shown in FIGS. 1, 3, 4 and 8, the optical fiber 100 extends substantially coaxially through the coil 42 and the central heating region 56. However, the stripping apparatus 10 of the first embodiment is configured to enable a wide position tolerance of the optical fiber 100 during the stripping process. For example, the diameters of the loops 44 and the spacing between the loops are configured for creating a large and substantially uniform temperature field in the central heating region 56 while minimizing the thermal mass of the heater 20. For example, the spacing between adjacent loops 44 can be less that the radius of the loops, which seeks to ensure a substantially uniform temperature within the central heating region 56, in both axial and radial directions. In contrast to the optical fiber 100 being coaxially centered in the heating region 56 as shown in FIG. 8, the optical fiber 100 may be offset from the center as shown in FIGS. 9 and 10.

Figure 9:
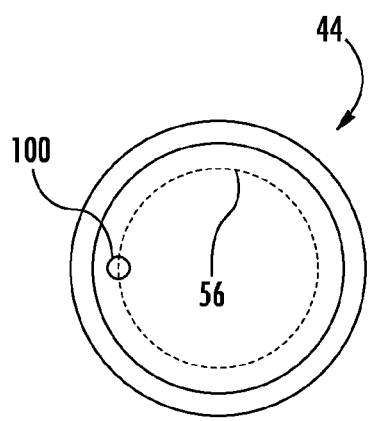
FIGS. 9 and 10 are schematic views like FIG. 8, except that the optical fiber is offset from the center of the central heating region, in accordance with other examples of the first embodiment.
Figure 10:
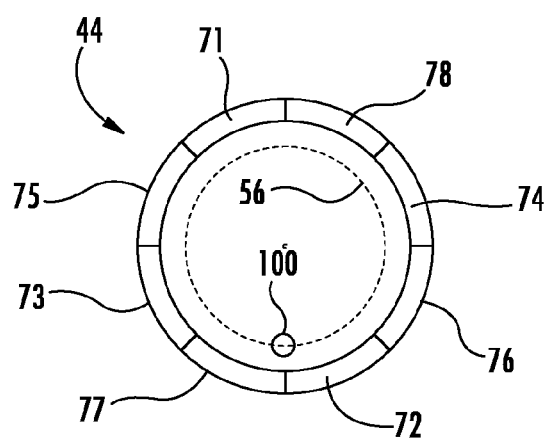
Figure 11:
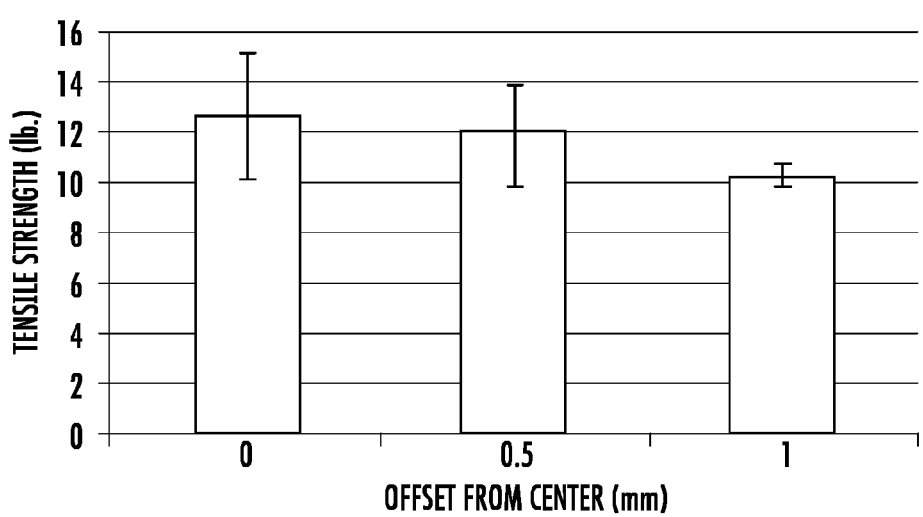
FIG. 11 is a chart indicating examples of tensile strengths of stripped optical fibers as a function of offset from the center of the central heating region.

As specific examples, the central heating region 56 may have a diameter of about 2 mm, the optical fiber 100 may be horizontally offset from the central lengthwise axis of the coil 42 by about 1 mm as shown in FIG. 9, and the optical fiber 100 may be vertically offset from the central lengthwise axis of the coil 42 by about 1 mm as shown in FIG. 10. In the first embodiment, the optical fibers 100 receive substantially the same amount of heat transfer within the central heating region 56, regardless of the offset amount and directions relative to the central lengthwise axis of the coil 42. Referring to FIG. 11, in one example, the tensile strength of optical fibers 100 stripped using the stripping apparatus 10 consistently reached more than 10 pounds when the optical fiber was positioned within the coil 42 in any locations within a 1 mm radius from the central lengthwise axis of the coil. The tensile strength is reduced at the 1 mm offset because the temperature is slightly higher at the 1 mm offset due to closer proximity to the coil 42.

The thermal mass of the heater 20 and fiber 100 may be low enough such that natural convection substantially brings down their temperatures to the ambient temperature sufficiently rapidly such that any thermal decomposition and oxidization of the remaining edges of the coatings 120, 130 can be substantially eliminated without the need for requiring a non-oxidizing gas environment. Restricting any oxidization can also preserve the tensile strength of the fiber 100, such as by maintaining at least about 98% or over 98% of the tensile strength of the fiber 100.

In accordance with the first embodiment, the heater 20 is operated to rapidly heat the coatings 120, 130 of the fiber section 150 by way of natural convection and any associated conductive and radiant heat transfer. The stripping apparatus 10 of the first embodiment does not use forced convention to heat the coatings 120, 130 and the coatings are not heated in an inert gas environment. Accordingly, in one method of operating the stripping apparatus 10, the fan 36 and heater 20 are not operated simultaneously. Rather, to increase the cycle time of the process and manage any decomposed coating gas, after the heater 20 is automatically turned off by the controller 22, the controller can automatically turn on the fan 36 so that the heater is cooled by forced ambient air that is drawn through the coil by the fan to rapidly reduce the temperature of the heater to the ambient temperature. The fan 36 may also direct any smoke, or the like, from the decomposed coatings 120, 130 to the air filter 38. For example, the stripping apparatus 10 may be automatically operative, such as under the control of the controller 22, so that the fan 36 is automatically turned on at about 1 second after the heater 20 is automatically turned off, and the fan is automatically turned off after operating for about 5 seconds. The noise associated with the turning on of fan 36, or any other suitable signal, may serve as notification to the user that the optical fiber 100 presently extending into the stripping apparatus 10 has been stripped and can be removed. The change in noise associated with the subsequent turning off of fan 36, or any other suitable signal, may serve as notification to the user that the next optical fiber 100 to be stripped may be inserted into the stripping apparatus 10. The controller 22 can be configured for automatically: restricting (e.g., preventing) operation of the fan 36 while the heater 20 is on; causing the fan 36 to operate while the heater off; and/or activating the fan after the heater has been deactivated.

Referring back to FIG. 10, the representative loop 44 is schematically shown as comprising a continuous series of sections 71, 72, 73, 74, 75, 76, 77, 78 that are substantially radially symmetrical about the lengthwise axis of the heating region 56. Each of the sections 71, 72, 73, 74, 75, 76, 77, 78 can be characterized as being or functioning as an electrically resistive element that becomes hot when electrical current flows therethrough, whereby each of the sections 71, 72, 73, 74, 75, 76, 77, 78 may be characterized as being a heat source. The heat sources 71, 72 are spaced apart from one another in a first direction, and the heating region 56 is positioned between the heat sources 71, 72. Similarly, the heat sources 73, 74 are spaced apart from one another in a second direction, and the heating region 56 is positioned between the heat sources 73, 74. The first and second directions can be crosswise, or more specifically perpendicular, to one another.

The heat sources 75, 76 are spaced apart from one another in a third direction, and the heating region 56 is positioned between the heat sources 75, 76. Similarly, the heat sources 77, 78 are spaced apart from one another in a fourth direction, and the heating region 56 is positioned between the heat sources 77, 78. The third and fourth directions can be crosswise, or more specifically perpendicular, to one another. The first and third directions can be crosswise, or at an angle of 45 degrees, to each other. The second and fourth directions can be crosswise, or at an angle of 45 degrees, to each other. In accordance with the first embodiment, each of the loops 44 comprises a plurality of the heat sources 71, 72, 73, 74, 75, 76, 77, 78, and the loops 44 (e.g., pluralities of heat sources 71, 72, 73, 74, 75, 76, 77, 78) are spaced along the length of the heating region 56.

Variations are within the scope of this disclosure. For example, a variety of differently configured heaters can be constructed, such as through techniques that may comprise three-dimensional printing, or the like, of nichrome or other high-temperature resistive materials. As another example, first and second embodiments of this disclosure can be alike, except for variations noted and variations that will be apparent to those of ordinary skill in the art. Accordingly, for elements of the first and second embodiment that are at least generally alike, reference numerals for the second embodiment are incremented by 200 as compared to the first embodiment. For example and referring to FIGS. 10 and 13, the heat sources 71, 72, 73, 74, 75, 76, 77, 78 of the first embodiment can generally correspond to heat sources 271, 272, 273, 274, 275, 276, 277, 278 of the second embodiment.

Figure 12:
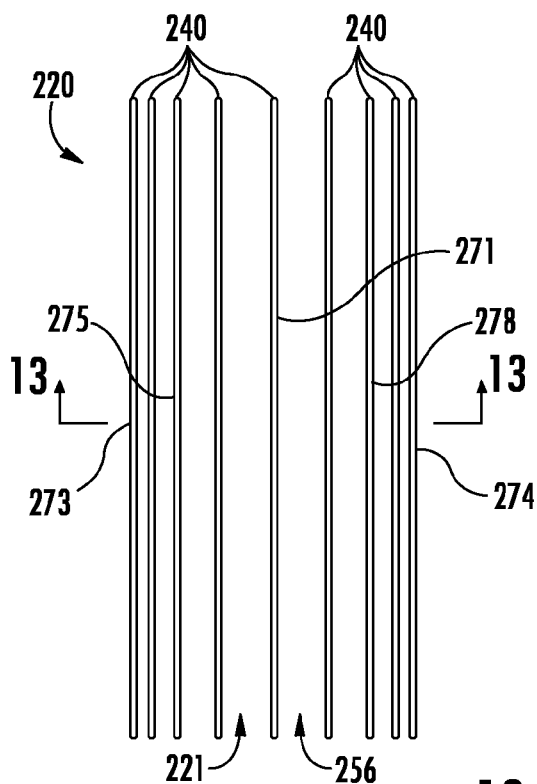
FIG. 12 is representative of isolated schematic plan and side elevation views of a portion of a heater of an optical fiber stripping apparatus, in accordance with a second embodiment of this disclosure.
Figure 13:
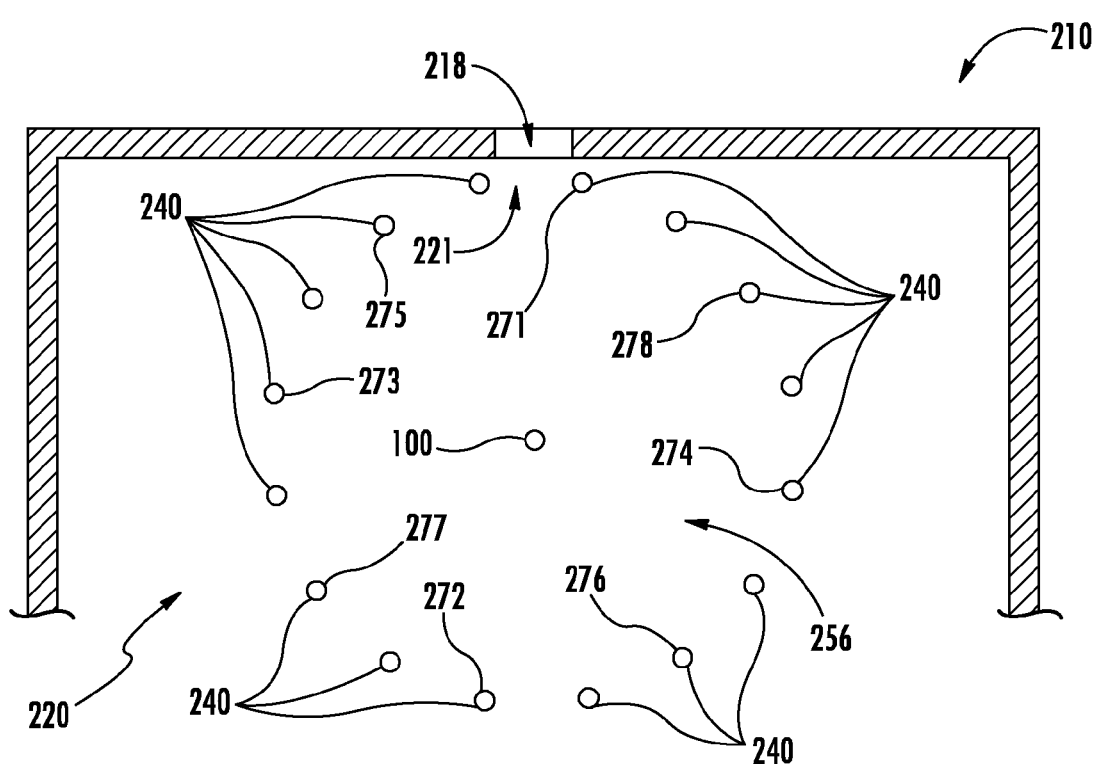
FIG. 13 is a cross-sectional view of a portion of the optical fiber stripping apparatus of the second embodiment, wherein the cross-section is generally taken along line 13-13 of FIG. 12.

Referring to FIGS. 12 and 13, a heater 220 of the second embodiment includes a series of conductors, wires, or sections of one or more wires 240 that are arranged in lengths that extend along, and collectively extend at least partially around, the heating region 256. Referring to FIG. 12, an elongate open slot 221 is defined between adjacent wires 240. Referring for example to FIG. 13, an optical fiber 100 may be laterally placed into, and retrieved from, the heating region 256 by way of the elongate slot 221. The elongate slot 221 may be adjacent to, and accessible by way of, an elongate main opening 218 in a housing 212 containing the heater 220.

In an alternative embodiment, a fixture, which is holding the optical fiber, may be slid or otherwise moved into the heating region, and then, after stripping, the optical fiber may be removed from clamp(s) of the fixture after stripping, without having to pull the fiber back through the main opening 18 (FIGS. 1 and 2).

The controller 22 may comprise a field effect transistor (FET) which is gated by a programmable pulse generator. The controller 22 may include an internal switch that opens and closes a circuit which provides the electrical current to the heater 20. The controller 22 can turn on or switch on the heater 20 by closing the internal switch to initiate a flow of electrical current to the heater 20. Conversely, the controller 22 can turn off the heater 20 by opening the internal switch to stop the flow of electrical current to the heater 20 when the termination condition is met, wherein the termination condition can be a predetermined time, such as the predetermined times discussed above. The controller 22 may include processing circuitry, such as processing circuitry of a computer, that is configurable to perform actions in accordance with one or more exemplary embodiments disclosed herein. In some exemplary embodiments, the processing circuitry may include a processor and memory. The processing circuitry may be in communication with or otherwise control, for example, a user interface, and one or more other components, features and/or modules (e.g., software modules). The user interface can include an activating feature, such as an icon, key, push-button switch 26, or the like, for being actuated by a user to initiate the stripping process. The processor may be embodied in a variety of forms. For example, the processor may be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. The processor may comprise a plurality of processors. Whether configured by hardware or by a combination of hardware and software, the processor is capable of performing operations according to various embodiments of this disclosure.

Persons skilled in fiber stripping or optical connectivity will appreciate additional variations and modifications of the devices and methods already described. Additionally, where a method claim below does not explicitly recite a step mentioned in the description above, it should not be assumed that the step is required by the claim. Furthermore, where a method claim below does not actually recite an order to be followed by its steps or an order is otherwise not required based on the claim language, it is no way intended that any particular order be inferred.

The above examples are in no way intended to limit the scope of the present invention. It will be understood by those skilled in the art that while the present disclosure has been discussed above with reference to examples of embodiments, various additions, modifications and changes can be made thereto without departing from the spirit and scope of the invention as set forth in the claims.

What is claimed is:

1. An apparatus for removing at least one coating from a lengthwise section of an optical fiber, wherein the at least one coating comprises a primary coating contacting the optical fiber, the apparatus comprising:
    a heater extending at least partially around and at least partially defining an elongate heating region configured for receiving the lengthwise section of the optical fiber, wherein the heater is configured for heating the heating region to a temperature above a thermal decomposition temperature of the primary coating; and
    a controller operatively associated with the heater for automatically deactivating the heater;
    wherein:
        the heater comprises heat sources;
        a first plurality of the heat sources is spaced along a length of the heating region from a second plurality of the heat sources; and
        for each plurality of heat sources of the first and second pluralities of heat sources, the plurality of heat sources comprises:
            first and second heat sources spaced apart from one another in a first direction, wherein the heating region is positioned between the first and second heat sources, and
            third and fourth heat sources spaced apart from one another in a second direction, wherein the heating region is positioned between the third and fourth heat sources, and the first and second directions extend crosswise to one another.

2. The apparatus of claim 1, further comprising:
    a support apparatus configured to hold the optical fiber so that the optical fiber extends away from the support apparatus and into the heating region in a cantilevered manner.

3. The apparatus of claim 1, wherein the controller is configured for automatically deactivating the heater by not later than immediately after removal of the at least one coating from the lengthwise section of the optical fiber in the heating region.

4. The apparatus of claim 1, further comprising at least one sidewall configured to at least partially enclose the heater.

5. The apparatus of claim 1, further comprising a housing defining an interior chamber and main opening configured for providing access to the interior chamber from outside of the housing, wherein the heating region is positioned in the interior chamber and configured for receiving the lengthwise section of the optical fiber by way of the main opening to the interior chamber.

6. The apparatus of claim 5, wherein the housing is configured so that the heating region is open to ambient environment during operation of the heater.

7. The apparatus of claim 6, further comprising:
an air mover configured for being operated to cause ambient air to flow along a flowpath through the interior chamber to cool the heater, wherein:
the heater is positioned in the flowpath,
the apparatus is configured so that the flowpath extends crosswise to a lengthwise axis of the heating region; and
the controller is operatively associated with the air mover for activating or deactivating operation of the air mover.

8. The apparatus of claim 7, wherein the controller is operatively associated with the air mover for restricting operation of the air mover while the heater is on.

9. The apparatus of claim 7, wherein the controller is operatively associated with the air mover for causing the air mover to operate while the heater off.

10. The apparatus of claim 7, wherein the controller is operatively associated with the air mover for activating the air mover after the heater has been deactivated.

11. The apparatus of claim 7, wherein the housing further includes upstream and downstream openings in opposite sidewalls to define the flowpath through the interior chamber, and wherein the housing is configured so that the upstream and downstream openings remain open during operation of the heater.

12. The apparatus of claim 1, wherein:
the controller is configured for activating the heater to cause the heater to heat the heating region to the temperature above the thermal decomposition temperature of the primary coating; and
the controller is configured for deactivating the heater at a predetermined time after the controller activates the heater.

13. The apparatus of claim 12, wherein the predetermined time is within a range of from about 1 second to about 3 seconds after the heater is activated.

14. The apparatus of claim 12, wherein the predetermined time is within a range of from about 1.7 seconds to about 2.1 seconds after the heater is activated.

15. The apparatus of claim 1, wherein:
the heater is an electrical heater; and
each of the first, second, third and fourth heat sources respectively are first, second, third and fourth electrically resistive elements configured to become hot in response to electrical current passing therethrough.

16. The apparatus of claim 15, wherein the first, second, third and fourth electrically resistive elements comprise sections of at least one bent piece of wire extending around the heating region and configured to become hot in response to electrical current passing therethrough.

17. The apparatus of claim 1, wherein:
the controller is part of a controller system;
the controller system further includes an activating feature that is positioned outside of the interior chamber and operatively associated with the controller; and
the activating feature is configured for being manually operated to initiate activation of the heater.

* * * * *